US 6,568,655 B2

(12) United States Patent
Paese et al.

(10) Patent No.: US 6,568,655 B2
(45) Date of Patent: May 27, 2003

(54) RADAR DEVICES FOR LOW POWER APPLICATIONS AND BATHROOM FIXTURES

(75) Inventors: Andrew J. Paese, Plymouth, WI (US); Steven M. Tervo, Plymouth, WI (US); Carter J. Thomas, Cedarburg, WI (US); William R. Burnett, Menlo Park, CA (US); David C. Shafer, Menlo Park, CA (US); Fred Judson Heinzmann, Los Altos, CA (US)

(73) Assignee: Kohler Company, Kohler, WI (US)

( * ) Notice: Subject to any disclaimer, the term of this patent is extended or adjusted under 35 U.S.C. 154(b) by 0 days.

(21) Appl. No.: 10/090,970

(22) Filed: Mar. 4, 2002

(65) Prior Publication Data

US 2002/0171056 A1 Nov. 21, 2002

Related U.S. Application Data

(60) Continuation of application No. 09/817,592, filed on Mar. 26, 2001, now Pat. No. 6,388,609, which is a division of application No. 09/118,050, filed on Jul. 17, 1998, now Pat. No. 6,206,340.
(60) Provisional application No. 60/052,960, filed on Jul. 18, 1997.

(51) Int. Cl.[7] .................................................. E03D 5/10
(52) U.S. Cl. .......................... 251/129.04; 4/304; 4/305; 4/406; 4/623; 137/2; 342/27; 342/28
(58) Field of Search .......................... 4/304, 305, 406; 4/623; 137/2; 251/129.04; 342/27, 28

(56) References Cited

U.S. PATENT DOCUMENTS

| 3,686,669 A | 8/1972 | Toulis |
| 3,796,208 A | 3/1974 | Bloice |
| 3,895,383 A | 7/1975 | Korman |
| 3,932,871 A | 1/1976 | Foote |
| 4,072,941 A | 2/1978 | Hamid et al. |
| 4,125,835 A | 11/1978 | Barry |
| 4,141,091 A | 2/1979 | Pulvari |
| 4,358,759 A | 11/1982 | Stewart et al. |
| 4,402,095 A | 9/1983 | Pepper |

(List continued on next page.)

FOREIGN PATENT DOCUMENTS

| DE | 30 08 025 | 9/1981 |
| DE | 39 20 581 | 1/1991 |
| EP | 0 251 498 A3 | 1/1988 |
| EP | 0 783 058 A2 | 7/1997 |
| WO | WO 91/13370 | 9/1991 |
| WO | WO 96/19737 | 6/1996 |

OTHER PUBLICATIONS

Stover, D., "Special Report: The Ocean Planet: Radar on A Chip, 101 Uses In Your Life", *Popular Science*, (6 pgs) (Mar. 1995).
McEwan, T., "A Probing Look at Emerging Technologies and the Strategic Markets They Create,"*Futuretech* 175:1–13 (Jul. 1994).

*Primary Examiner*—George L. Walton
(74) *Attorney, Agent, or Firm*—Merchant & Gould, PC

(57) ABSTRACT

A fluid flow device includes an actuator, an RF transmitter, a gated RF receiver, and a processor. The RF transmitter is configured and arranged to produce a plurality of pulses of RF energy spaced apart in time to form a sensor field. The gated RF receiver is configured and arranged to receive RF energy reflected by objects within the sensor field. The processor is coupled to the gated RF receiver for evaluating the reflected RF energy. The processor is also coupled to the actuator and is configured and arranged to activate the actuator in response to the reflected RF energy to control fluid flow. In addition, a new low power radar sensor operates by providing radar pulses that are non-uniformly spaced in time. In operation, a burst of pulses is initiated in the transmitter. Between each burst is a period of rest time in which the transmitter is not transmitting RF energy.

20 Claims, 10 Drawing Sheets

U.S. PATENT DOCUMENTS

| | | |
|---|---|---|
| 4,433,328 A | 2/1984 | Saphir et al. |
| 4,567,484 A | 1/1986 | Schilz et al. |
| 4,642,641 A | 2/1987 | Campbell |
| 4,651,152 A | 3/1987 | Harmuth |
| 4,673,935 A | 6/1987 | Spencer |
| 4,697,184 A | 9/1987 | Cheal et al. |
| 4,742,583 A | 5/1988 | Yoshida et al. |
| 4,743,906 A | 5/1988 | Fullerton |
| 4,756,031 A | 7/1988 | Barrett |
| 4,797,621 A | 1/1989 | Anderson et al. |
| 4,891,649 A | 1/1990 | Labaar et al. |
| 4,921,211 A | 5/1990 | Novak et al. |
| 4,949,074 A | 8/1990 | D'Ambrosia et al. |
| 4,952,939 A | 8/1990 | Seed |
| 4,975,703 A | 12/1990 | Delisle et al. |
| 4,979,186 A | 12/1990 | Fullerton |
| 4,981,158 A | 1/1991 | Brondolino et al. |
| 4,998,673 A | 3/1991 | Pilolla |
| 5,025,516 A | 6/1991 | Wilson |
| 5,030,956 A | 7/1991 | Murphy |
| 5,033,715 A | 7/1991 | Chiang et al. |
| 5,043,705 A | 8/1991 | Rooz et al. |
| 5,148,175 A | 9/1992 | Woolfolk |
| 5,150,123 A | 9/1992 | Orlowski et al. |
| 5,150,126 A | 9/1992 | Knepper et al. |
| 5,173,178 A | 12/1992 | Kawashima et al. |
| 5,187,816 A | 2/1993 | Chiou |
| 5,187,818 A | 2/1993 | Barrett, Sr. et al. |
| 5,227,797 A | 7/1993 | Murphy |
| 5,243,717 A | 9/1993 | Yasuo |
| 5,311,189 A | 5/1994 | Nagel |
| 5,345,471 A | 9/1994 | McEwan |
| 5,361,070 A | 11/1994 | McEwan |
| 5,363,108 A | 11/1994 | Fullerton |
| 5,369,818 A | 12/1994 | Barnum et al. |
| 5,457,394 A | 10/1995 | McEwan |
| 5,465,094 A | 11/1995 | McEwan |
| 5,471,198 A | 11/1995 | Newham |
| 5,482,250 A | 1/1996 | Kodaira |
| 5,504,490 A | 4/1996 | Brendle et al. |
| 5,508,510 A | 4/1996 | Laverty, Jr. et al. |
| 5,510,800 A | 4/1996 | McEwan |
| 5,512,834 A | 4/1996 | McEwan |
| 5,517,198 A | 5/1996 | McEwan |
| 5,519,400 A | 5/1996 | McEwan |
| 5,521,600 A | 5/1996 | McEwan |
| 5,523,760 A | 6/1996 | McEwan |
| 5,541,605 A | 7/1996 | Heger |
| 5,543,799 A | 8/1996 | Heger |
| 5,563,605 A | 10/1996 | McEwan |
| 5,570,869 A | 11/1996 | Diaz et al. |
| 5,573,012 A | 11/1996 | McEwan |
| 5,576,627 A | 11/1996 | McEwan |
| 5,581,256 A | 12/1996 | McEwan |
| 5,589,838 A | 12/1996 | McEwan |
| 5,609,059 A | 3/1997 | McEwan |
| 5,610,611 A | 3/1997 | McEwan |
| 5,630,216 A | 5/1997 | McEwan |
| 5,661,385 A | 8/1997 | McEwan |
| 5,661,490 A | 8/1997 | McEwan |
| 5,682,164 A | 10/1997 | McEwan |
| 5,754,144 A | 5/1998 | McEwan |
| 5,757,320 A | 5/1998 | McEwan |
| 5,766,208 A | 6/1998 | McEwan |
| 5,767,953 A | 6/1998 | McEwan |
| 5,774,091 A | 6/1998 | McEwan |
| 5,920,278 A | 7/1999 | Tyler et al. |
| 5,986,600 A | 11/1999 | McEwan |
| 6,067,040 A | 5/2000 | Puglia |
| 6,067,673 A | 5/2000 | Paese et al. |
| 6,114,971 A | 9/2000 | Nysen |
| 6,208,248 B1 | 3/2001 | Ross |
| 6,239,736 B1 | 5/2001 | McDonald et al. |
| 6,239,741 B1 | 5/2001 | Fotana et al. |
| 6,250,601 B1 | 6/2001 | Kolar et al. |

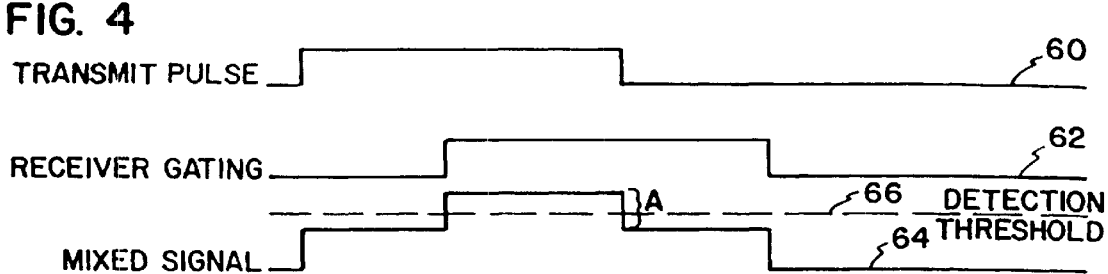
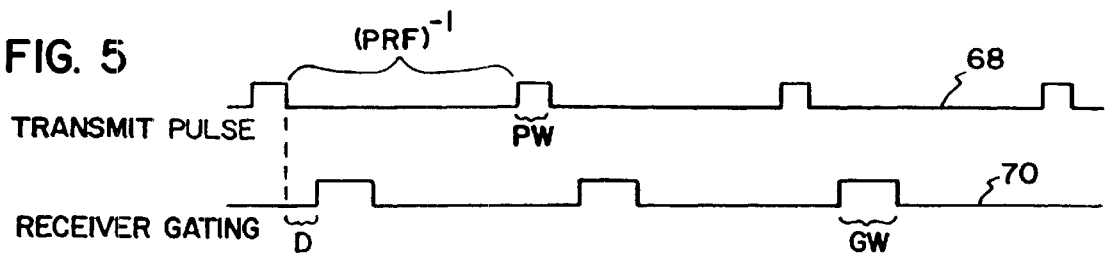
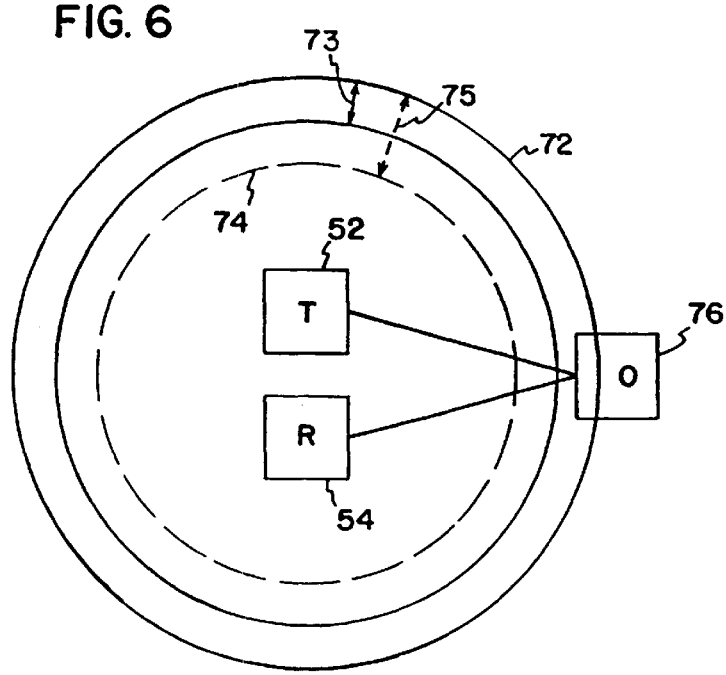

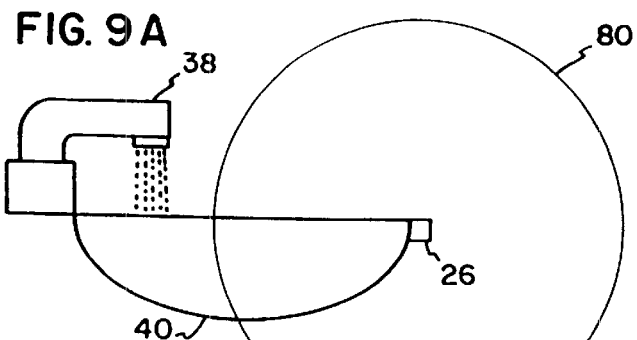
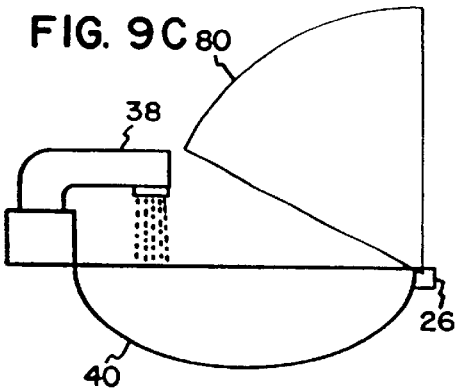
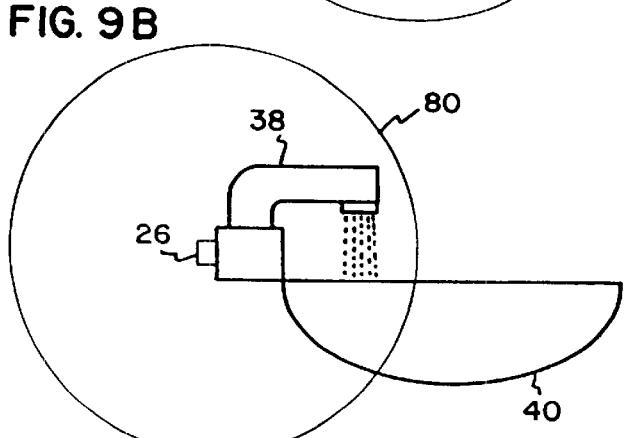
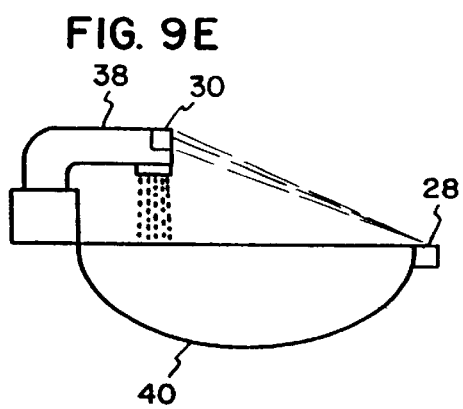
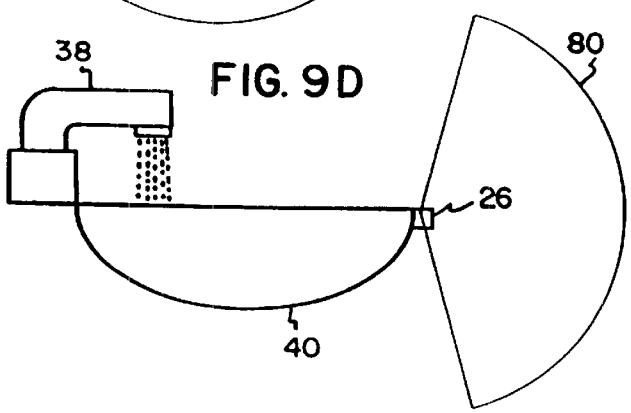
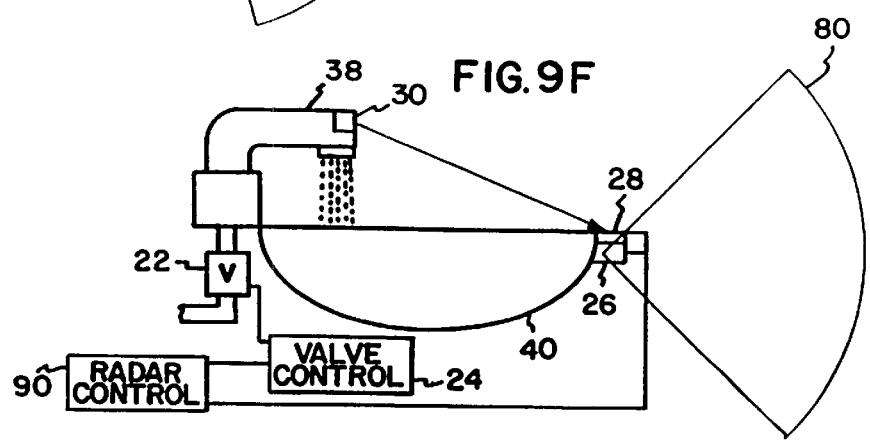

RADAR DEVICES FOR LOW POWER APPLICATIONS AND BATHROOM FIXTURES

The present application is a continuation under 37 CFR 1.53(b) of U.S. utility application Ser. No. 09/817,592, filed Mar. 26, 2001 entitled "Radar Devices for Low Power Applications and Bathroom Fixtures", now U.S. Pat. No. 6,388,609 B2, incorporated by reference. Ser. No. 09/817,592 is a divisional application under 37 CFR 1.53(b) of U.S. utility application Ser. No. 09/118,050, filed Jul. 17, 1998, entitled "Radar Devices for Low Power Applications and Bathroom Fixtures", now U.S. Pat. No. 6,206,340 B1, the contents of which are incorporated herein by reference. Ser. No. 09/118,050 is related to U.S. provisional application No. 60/052,960, filed Jul. 18, 1997, entitled "Devices Utilizing Radar Detection of a User for Initiating Fluid Flow," the contents of which are herein incorporated by reference.

FIELD OF THE INVENTION

The present invention is directed to devices utilizing radar. In particular, the present invention is directed to low power radar devices and to radar-controlled fluid flow control devices and bathroom, restroom, or kitchen fixtures.

BACKGROUND OF THE INVENTION

In light of concerns about public health and safety, the development of touchless controls on bathroom and restroom fixtures has received a large amount of attention. Germs, bacteria, disease, and other harmful materials may be spread from one person to another by touching the handles on toilets, urinals, sinks, and other fixtures in public restrooms.

A variety of touchless control systems have been developed. Many conventional touchless control systems employ an infrared or, less commonly, a visible light detector for sensing a user. The detector typically produces appropriate signals that open or close an actuator, such as a valve, attached to a water inlet conduit of the fixture to, for example, flush a toilet or cause a stream of water to flow out of a faucet. Infrared radiation can be detected passively by sensing heat from a user. Alternatively, infrared light can be emitted by a device, such as a light emitting diode (LED), and reflected from a user to an infrared detector, such as a photocell.

The use of infrared detection has several limitations. First, infrared radiation cannot penetrate most materials because of the short wavelength of the radiation. Thus, infrared emitters and detectors are typically either exposed or are positioned behind a window made of material that is transparent to infrared radiation. In addition, infrared sensors can be inadvertently or purposefully blocked by the presence of material, such as paper, dust, or cloth, in front of the emitter or detector.

Another disadvantage of infrared detection is that the reflectivity of objects, such as clothing, varies widely. Thus, the infrared detector must be sensitive to a wide variation in the strength of reflected signals. There is a risk that the detector may fail to detect a user with clothing or other articles that absorb or only weakly reflect infrared radiation.

These disadvantages of infrared detectors may cause faulty responses by the fixture (e.g., flushing of a toilet at an inappropriate time or maintaining constant flow of water in a toilet or sink) or may result in a failure to operate until the sensor area is cleaned or blocking objects are removed. Thus, there is a need for a new type of detector that can overcome these deficiencies of current detectors.

Another issue is the amount of power available for operating automatic or touchless fixtures. These devices may be battery-operated for convenience or because there is no near source of ac power. To operate for a year or more, it is often necessary to prepare low power devices. Many types of detection devices require significant amounts of power and new ways need to be developed to reduce the power needs of such devices.

SUMMARY OF THE INVENTION

The present invention is directed to fluid flow devices and sensors that may address these needs. In one embodiment, a fluid flow device includes an actuator, an RF transmitter, a gated RF receiver, and a processor. The RF transmitter is configured and arranged to produce a plurality of pulses of RF energy spaced apart in time to form a sensor field. The gated RF receiver is configured and arranged to receive RF energy reflected by objects within the sensor field. The processor is coupled to the gated RF receiver for evaluating the reflected RF energy. The processor is also coupled to the actuator and is configured and arranged to activate the actuator in response to the reflected RF energy to control fluid flow.

Another embodiment is a fixture that includes a valve for controlling fluid flow through the fixture, an actuator for opening and closing the valve, and a sensor for activating the actuator. The sensor includes an RF transmitter, a gated RF receiver, and a processor. The RF transmitter is configured and arranged to produce a plurality of pulses of RF energy spaced apart in time to form a sensor field. The gated RF receiver is configured and arranged to receive RF energy reflected by objects within the sensor field. The processor is coupled to the gated RF receiver for evaluating the reflected RF energy. The processor is also coupled to the actuator and is configured and arranged to activate the actuator in response to the reflected RF energy to control fluid flow.

Another embodiment is a method of providing fluid flow in response to a user. A pulsed RF signal is transmitted by a transmitter to form a sensor field. Reflections of the RF signal are received by a receiver from objects within the sensor field. These reflections are evaluated to determine a characteristic of a user. An actuator is activated based on the evaluation of the reflections of the RF signal. The actuator controls fluid flow in a fixture.

Yet another embodiment is a sensor. The sensor includes a burst initiator, a transmitter pulse generator, an RF oscillator, a transmitter antenna, a receiver antenna, a receiver pulse generator, a receiver delay line, and a receiver sampler. The burst initiator provides a plurality of bursts at a burst rate and having a burst width that is 5% or less than a time between bursts. The transmitter pulse generator produces a plurality of transmitter pulses at a transmitter pulse rate and with a transmitter pulse width during each burst. The RF oscillator provides pulses of RF energy in response to the transmitter pulses and the transmitter antenna transmits the pulses of RF energy to form a sensor field. The receiver antenna receives RF energy reflected off objects in the sensor field. The receiver pulse generator is couple to the transmitter pulse generator and generates receiver pulses at a receiver pulse rate and with receiver pulse width. The receiver delay line delays the receiver pulses with respect to the transmitter pulses. The receiver sampler samples the RF energy receiver by the receiver antenna during the receiver pulses.

BRIEF DESCRIPTION OF THE DRAWINGS

The invention may be more completely understood in consideration of the following detailed description of various embodiments of the invention in connection with the accompanying drawings, in which:

FIG. 4 is a timing diagram for an embodiment of the radar system of FIG. 3 which utilizes RF transmitter bursts;

FIG. 5 is a timing diagram for another embodiment of the radar system of FIG. 3 which utilizes ultra-wideband (UWB) transmission pulses;

FIG. 6 is a schematic diagram of detection shells in an ultra-wideband radar system having the timing diagram of FIG. 5;

FIGS. 9A–9F are side elevational views of various embodiments of a sink and faucet incorporating the radar-controlled fluid flow control device of FIG. 1;

Figure 1:
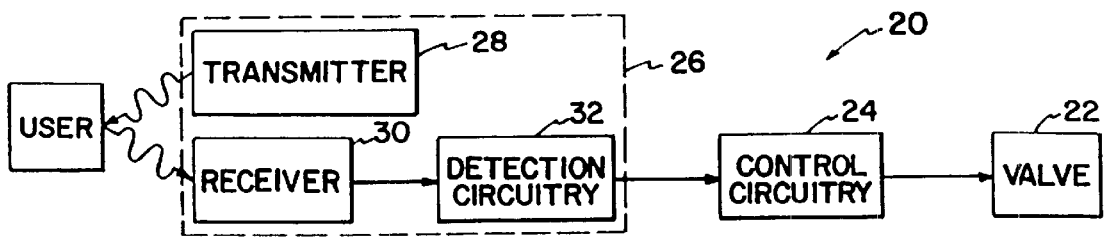
FIG. 1 is a schematic block diagram of one embodiment of a fluid flow control device according to the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE ILLUSTRATED EMBODIMENTS

The present invention is directed to a fluid flow control device that uses radar to detect the presence, position, motion, and/or direction of motion of an individual in a radar sensor field and responds in a predetermined manner to the results of the radar detection. For example, a fluid flow control device may be attached to a water inlet conduit of a toilet or urinal, the device using radar to detect the entry and exit of a user from a radar sensor field around the toilet or urinal and responding to the user's movement by flushing the toilet or urinal to remove waste after the user leaves.

In addition, the present invention is directed to a low power pulsed radar system. Although this system can be used in the fluid flow control devices, the use of the radar system is not limited to such devices. The radar system could be used, for example, in intrusion alarms, emergency lighting, toys, and other radar sensor applications, particularly, short-range applications in which operating power is low.

Fluid Flow Control Devices

In one embodiment, a fluid flow control device includes a radar sensor unit, having a transmitter and a receiver, that generate a sensor field. The transmitter emits an electromagnetic signal and the receiver receives reflections of the electromagnetic signal resulting from interactions between the signal and one or more objects within the sensor field. The fluid flow control device also includes detection circuitry coupled to the sensor unit to detect a characteristic of an individual in the sensor field. Suitable characteristics include the presence of the individual in the sensor field, movement of the individual in the sensor field, direction of movement of the individual in the sensor field, or a combination thereof. An actuator, such as a valve, is coupled to the detection circuitry and configured for disposition in a conduit to control fluid flow through the conduit. The actuator opens and closes in a predetermined sequence in response to the detection circuitry.

This radar-controlled fluid flow control device allows for touchless control of a device, such as a toilet, urinal, sink, shower, bidet, or other fixture or appliance. The response of the device is typically dictated by the ordinary actions of the user. Such touchless controls are especially desirable in public restrooms where there is a concern that harmful germs, bacteria, or disease may be transferred to subsequent users of the fixture. In addition, the fluid flow control devices of the invention may also be utilized in other situations, such as in bathrooms or kitchens of private homes, for a variety of reasons including the maintenance of sanitary conditions and convenience.

The invention is also directed to the use of such fluid flow control devices with fixtures, appliances, and devices, and in particular with fixtures used in bathrooms and restrooms including toilets, urinals, bidets, showers, bathtubs, whirlpools, hand dryers, soap or lotion dispensers, sinks, and faucets, as well as with fixtures used in kitchens, such as sinks and faucets.

One embodiment is a waste disposal device such as a toilet or urinal which has a water inlet conduit, a waste depository in fluid communication with the water inlet conduit, and a water outlet conduit in fluid communication with the waste depository and through which waste is removed. The device also includes a radar sensor unit positioned near the waste depository. The radar sensor unit has a transmitter and receiver which generate a sensor field around the waste depository to detect a characteristic of a user of the waste disposal device. Suitable characteristics include the presence of the user in the sensor field, movement of the user in the sensor field, direction of movement of the user in the sensor field, or a combination thereof. An actuator is coupled to the radar sensor unit and positioned near or within the water inlet conduit to control water flow through the water inlet conduit. The actuator opens and closes in a predetermined sequence in response to the characteristic detected by the sensor unit. For example, the actuator is opened and allows water to flow through the water inlet conduit into the waste depository after a user exits the sensor field to remove waste from the waste depository.

A fluid flow control device 20 is schematically illustrated in FIG. 1. Device 20 contains an actuator 22, such as a valve, which is operated by control circuitry 24. A radar detector 26 sends input data to control circuitry 24 which then determines the appropriate response. Radar detector 26 typically includes a transmitter 28, a receiver 30, and detection circuitry 32.

Figure 2:
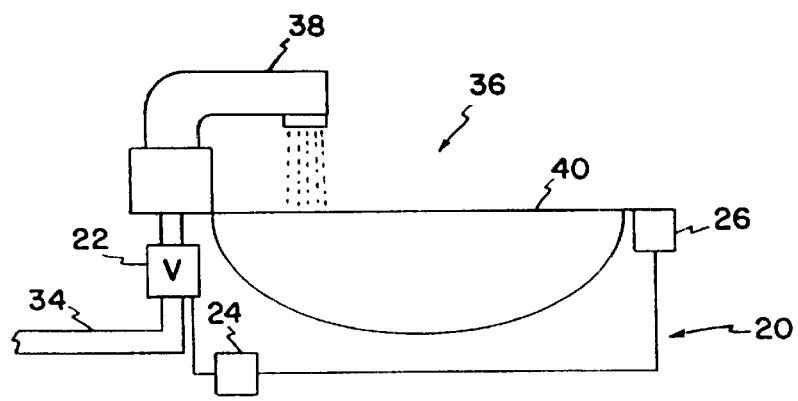
FIG. 2 is a side elevational view of a sink and a faucet having the fluid flow control device of FIG. 1.

Typically, as shown in FIG. 2, actuator 22 is connected to a water inlet conduit 34 of a fixture 36, exemplified as a faucet 38 and sink 40. Actuator 22 is configured to open and shut to control fluid flow into and/or through the fixture. For example, fluid flow control device 20 may be used in conjunction with a faucet 38 and sink 40 to control the water flow through faucet 38 into sink 40. In this case, actuator 22 is typically connected within water conduit 34 or between water conduit 34 and faucet 38. In one embodiment, actuator 22 is opened and water flows through faucet 38 when a user is detected. Actuator 22 is closed and water stops flowing through faucet 38 when the user leaves. Other configurations of actuator 22 and other positions of actuator 22 with respect to the fixture may also be used.

An example of suitable control circuitry 24 includes a solenoid with an armature attached to actuator 22 to open or shut actuator 22 in response to signals from radar detector 26. For example, a current may be applied through the solenoid to move the armature and open the actuator. An opposing current or a mechanical device, such as, for example, a spring, in the absence of current, may then be used to return the actuator to its closed position.

Control circuitry 24 may also include complex components such as a microprocessor that provide a programmed response based on the signals from radar detector 26. The programmed response may depend on the type of signal received (i.e., the presence of an individual or motion of an individual) or the sequence of received signals (i.e., two consecutive signals corresponding to entry and exit of an individual from a radar sensor field). To prevent false responses, a microprocessor-based controller may employ various software algorithms that use signal detection and statistical techniques, for example, signal averaging, to resolve signal-to-noise problems caused by spurious reflections and/or background clutter.

Radar Sensors

Radar detector 26 is a useful device for detecting an individual and/or actions of an individual in a sensor field. In general, radar detection is accomplished by transmitting a radar signal from a transmitter 28 and receiving reflections of the transmitted radar signal at receiver 30, the reflections arising from the interaction of the radar signal with an object. The strength of the reflected signal depends, in part, on the reflectivity and size of the object, as well as the distance to the object.

A variety of radar transmitters can be used. One type of radar transmitter continuously radiates an electromagnetic signal, often at a single frequency. One method for obtaining information from this signal is to measure the frequency of the reflected signal. If the object that reflects the signal is moving, the frequency of the reflected signal may be Doppler-shifted and provide motion and direction information. For example, an object moving away from the radar detector causes the frequency of the reflected signal to decrease and an object moving towards the detector causes the frequency of the reflected signal to increase. It will be appreciated that there are other continuous-wave radar systems and methods that can be used to obtain presence, position, motion, and direction information concerning an individual in the radar sensor field. These radar systems and methods may also be used in the devices of the invention.

Figure 3:
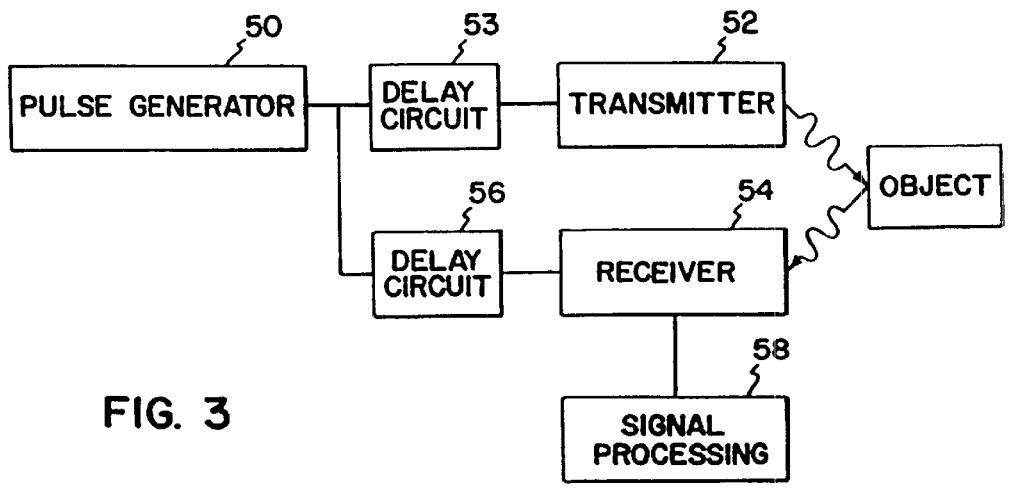
FIG. 3 is a schematic block diagram of one embodiment of a radar system of the fluid flow control device.

Another type of radar system useful in practicing the invention is pulsed radar in which pulses of electromagnetic energy are emitted by a transmitter and reflected pulses are received by a receiver. One pulsed radar configuration is schematically diagrammed in FIG. 3. This radar system includes a pulse generator 50 that generates pulses at a pulse repetition frequency (PRF), a transmitter 52 that transmits the radar signal in response to the pulses, an optional transmitter delay circuit 53 for delaying the radar signal, a receiver 54 for receiving the reflected radar signal, an optional receiver delay circuit 56 for gating open the receiver after a delay, and signal processing circuitry 58 for obtaining the desired presence, position, motion, and/or direction information from the reflected radar signal.

In one type of pulsed radar, a burst of electromagnetic energy is emitted at a particular RF frequency, the length of the burst corresponding to multiple oscillations of the signal at the radar frequency. One example of a radar system using RF frequency radar bursts is described in detail in U.S. Pat. No. 5,521,600, incorporated herein by reference. In this particular radar system, the transmit and receive signals are mixed in receiver 54 before signal processing.

A timing diagram for this particular radar system is provided in FIG. 4 which illustrates the transmitted RF burst 60, the receiver gating signal 62, and the mixed transmitter and receiver signal 64. The detection threshold 66 of the circuit may be set at a value high enough that only a mixed transmitter and receiver signal triggers detection. This radar system has a maximum detection range. Detectable signals arise only from objects that are close enough to the transmitter and receiver so that at least a portion of a transmitted burst travels to the object and is reflected back to the receiver within the length of time of the burst. The sensor field of this radar system covers the area within the maximum range of the radar system. Any object within that sensor field may be subject to detection.

Another type of pulsed radar system is ultra-wideband (UWB) radar which includes emitting pulses having nanosecond or subnanosecond pulse lengths. Examples of UWB radar systems can be found in U.S. Pat. Nos. 5,361,070 and 5,519,400, incorporated herein by reference. These UWB radar systems are also schematically represented by FIG. 3. However, for UWB radar systems the timing of the transmit pulse 68 and receiver gating 70, illustrated in FIG. 5, is significantly different from the above-described RF-burst radar systems. Transmit pulses are emitted by transmitter 52 at a pulse repetition frequency (PRF) determined typically by pulse generator 50. In some embodiments, the pulse repetition frequency may be modulated by a noise source so that transmit pulses are emitted at randomly varying intervals having an average interval length equal to the reciprocal of the pulse repetition frequency. Receiver 54 is gated open after a delay period (D) which is the difference between the delays provided by the receiver delay circuit 56 and the transmitter delay circuit 53. In UWB radar systems, the transmit pulses have a short pulse width (PW), typically, for example, 10 nanoseconds or less. The receiver is typically gated open after the transmitter pulse period, in contrast to the previously described RF burst radar systems in which the receiver is gated open during the transmitter pulse period.

In UWB systems, the delay period and length of the receiver gating and transmitter pulses define a detection shell 72, illustrated in FIG. 6. The detection shell defines the effective sensor field of the UWB radar system. The distance between the radar transmitter/receiver and the detection shell is determined by the delay period, the longer the delay period the further out the shell is located. The width 73 of the shell depends on the transmit pulse width (PW) and the receiver gate width (GW). Longer pulse widths or gate widths correspond to a shell 74 having greater width 75. Using UWB radar systems, characteristics of an object 76 in the shell, such as presence, position, motion, and direction of motion of an object, can be determined.

In some embodiments, two or more gating pulses with different delay times are used. The gating pulses may alternate with each timing pulse or after a block of timing pulses (e.g., one gating pulse is used with forty timing pulses and then the second is used with the next forty timing pulses). In other embodiments, a controller may switch between the two or more gating pulses depending on circumstances, such as the detection of a user. For example, a first gating pulse may be used to generate a detection shell that extends a particular distance from the fixture. When a user is detected, a second gating pulse may be used that generates a detection shell that is closer or further away than the first shell. Once a user leaves this second detection shell, the fixture may be activated, for example, a toilet may be flushed. The controller then resumes using the first gating pulse in preparation for another user. In yet other embodiments, more than one gating pulse is provided per transmit pulse, thereby generating multiple detection shells.

A potentially useful property of some UWB transmitters is that the transmitter antenna often continues to ring (i.e., continues to transmit) after the end of the pulse. This ringing creates multiple shells within the initial detection shell 72 thereby providing for detection of objects between detection shell 72 and the radar transmitter/receiver.

In either the RF-burst or UWB radar systems, delay circuits 53, 56 provide a fixed or variable delay period. A variable delay circuit may be continuously variable or have discrete values. For example, a continuously variable potentiometer may be used to provide a continuously variable delay period. Alternatively, a multi-pole switch may be used to switch between resistors having different values to provide multiple discrete delay periods. In some embodiments, delay circuits 53, 56 may simply be a conductor, such as a wire or conducting line, between pulse generator 50 and either transmitter 52 or receiver 54, the delay period corresponding to the amount of time that a pulse takes to travel between the two components. In other embodiments, delay circuits 53, 56 are pulse delay generators (PDG) or pulse delay lines (PDL).

Because of their versatility, radar systems can detect various characteristics of an individual in a radar sensor field (i.e., within the radar's detection range). For example, the presence of an individual can be detected from the strength of the return signal. This return signal can be compared with a background signal that has been obtained in the individual's absence and stored by the detector.

Another type of presence detector includes a transmitter and receiver separated by a region of space. The receiver is only gated open for a period of time sufficient to receive a signal directly transmitted from the transmitter. If the signal is reflected or blocked, it either does not arrive at the receiver or it arrives after the receiver is gated closed. This type of detector can be used, for example, as a "trip wire" that detects when an individual or a portion of an individual is interposed between the transmitter and receiver. Presence of an individual is indicated when the signal received during the gating period is reduced.

Position of the individual in the sensor field can be determined, for example, by sweeping through a series of increasingly longer, or later, receiver gating pulses. The detection of a reflected signal, optionally after subtraction of a background signal, indicates the distance of the individual away from the radar system.

Motion of an individual can be determined by a variety of methods including the previously described Doppler radar system. An alternative method of motion detection is described in U.S. Pat. Nos. 5,361,070 and 5,519,400 in which a received signal is bandpass filtered to leave only those signals that can be ascribed to human movement through the sensor field. Typically, the bandpass filter is centered around 0.1–100 Hz. U.S. Pat. No. 5,519,400 also describes a method for the determination of the direction of motion of an individual. This method includes the modulation of the delay period by ¼ of the center frequency of the transmission pulse to obtain quadrature information that can be used to determine the direction of motion of an object in the sensor field (e.g., toward and away from the detector).

Another method for detecting direction of motion is to compare consecutive signals or signals obtained over consecutive periods of time. For many radar systems, the reflected signal strength increases as an individual moves closer. As the individual moves further away, the signal typically decreases. The comparison of successive signals can then be used to determine the general direction of motion, either toward or away from the radar detector. The control circuitry may not activate the actuator prior to confirming the direction of the user over a period of time (e.g. 3–10 seconds) to ensure that the user is moving toward or away from the fixture.

One or more characteristics of an individual in the sensor field, such as presence, position, motion, or direction of motion, may be simultaneously or sequentially detected by one or more sensors. This information may be coupled into the control circuitry which determines an appropriate action. A microprocessor may be used to control the actuator based on these multiple pieces of information.

It will be appreciated that other methods may also be used to determine the presence, position, motion, and direction of motion of an individual in a radar sensor field.

Low Power Radar Sensor

A radar sensor for use with a fluid flow device, or with any other device, can operate using either ac or dc power. Although in many cases the radar sensor may operate using available ac power from an outlet, it may be convenient to use battery power instead. For example, radar sensors operating in bathroom fixtures may not be conveniently or aesthetically connectable to an outlet. In such cases, a battery-powered radar sensor may be desirable. However, it is also desirable that the lifetime of the batteries in the sensor be measured on the order of months or years. Thus, the development of low power radar sensors is desirable.

Often pulsed sensors can use less power than those that operate continuously.

Moreover, generally, the fewer pulses emitted per unit time, the less power needed for operation of the sensor. However, sensitivity often decreases with a decrease in pulse rate. In addition, it has been found that decreasing the pulse rate can also raise the impedance of a sampler in the receiver. This can place limits on the bandwidth of the sensor because even small amounts of stray capacitance can cause the frequency response of the receiver to roll off at very low frequencies. In addition, high output impedance may place stringent requirements on subsequent amplifier stages and provide a very susceptible point in the circuit for noise coupling.

Figure 10:
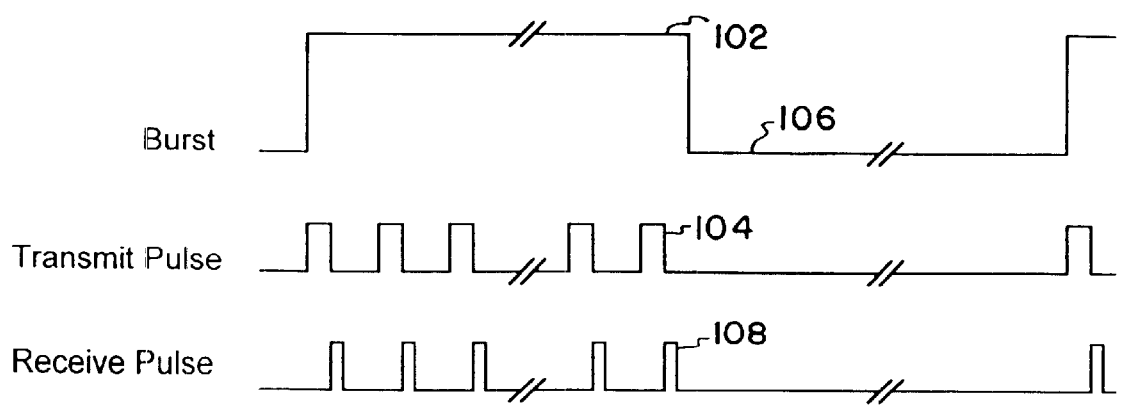
FIG. 10 is an exemplary block diagram of a burst-modified pulsed radar sensor.

A new low power radar sensor operates by providing radar pulses that are non-uniformly spaced in time. In operation, a burst 102 of pulses 104 is initiated in the transmitter, as shown in FIG. 10. Between each burst is a period 106 of rest time in which the transmitter is not transmitting RF energy. For example, a 1 to 100 microsecond burst of RF pulses may be made every 0.1 to 5 milliseconds. The RF pulses may be provided at, for example, a 0.5 to 20 MHz rate within the burst with an RF frequency ranging from, for example, 1 to 100 GHz. In this way, there is a relatively high pulse rate during the burst period, but with overall low power because the bursts only occur for 5% or less of the period between bursts. Although, the sensitivity of this radar sensor may be approximately the same as a radar sensor with the same number of pulses uniformly spaced in time, the impedance of the sampler during the burst period can be much less. In some embodiments, however, the burst period may be 10%, 25%, 50%, or more of the time between bursts.

Figure 11:
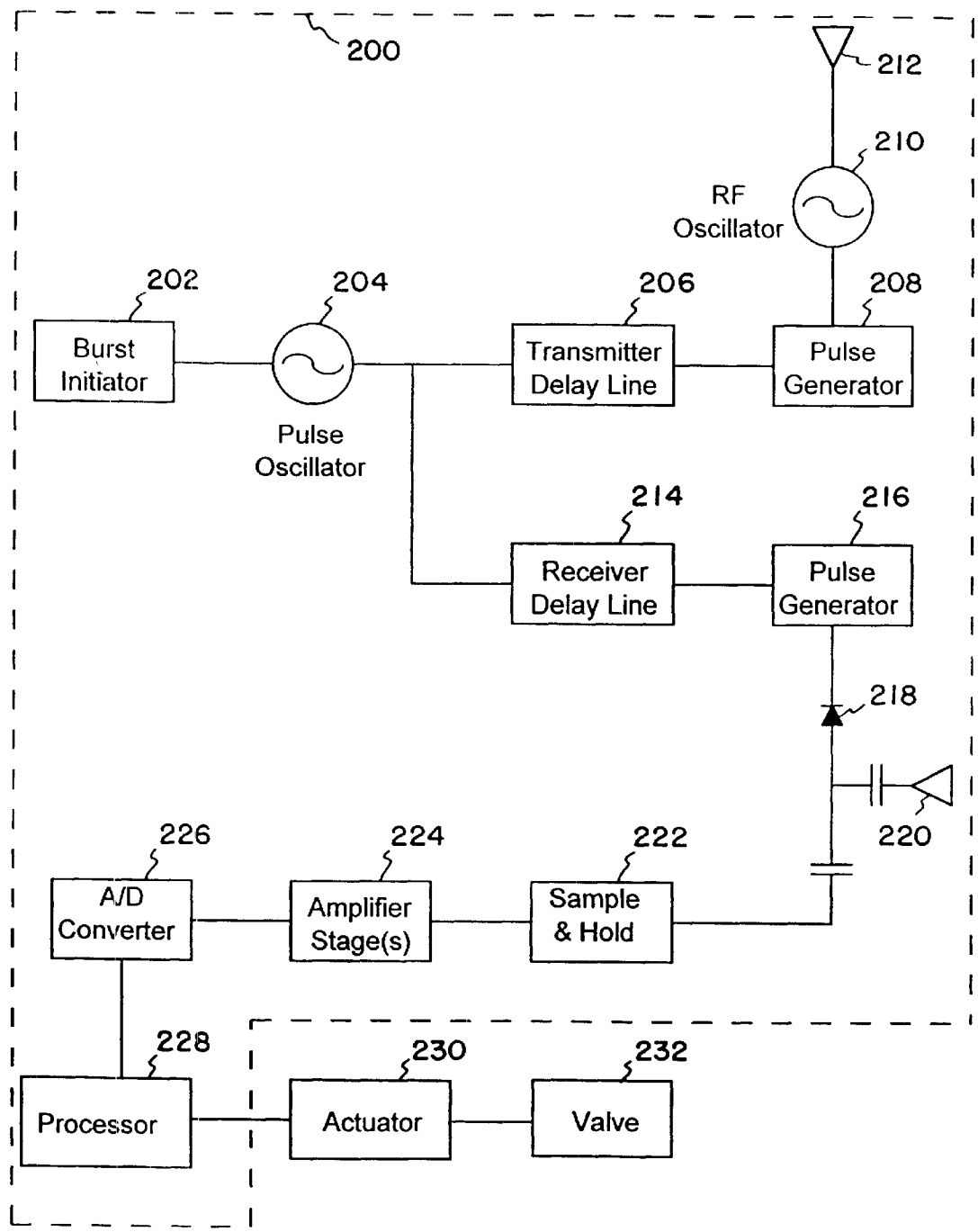
FIG. 11 is a block diagram of one exemplary embodiment of a low power radar sensor, according to the invention.

One exemplary low power radar sensor 200 is illustrated in FIG. 11. The radar sensor 200 includes a burst initiator 202 that triggers the beginning of the burst and may, optionally, trigger the end of the burst. A burst rate is defined as the rate at which bursts are provided. The burst width is the length of time of the burst. The time between bursts is the rest period. For many applications, the burst rate can range from, for example, 200 Hz to 10 kHz and often from, for example, 500 Hz to 2 kHz. The burst width can range from, for example, 1 to 200 microseconds and often from, for example, 5 to 100 microseconds. However, higher or lower burst rates and longer or shorter burst widths may be used. The particular burst rate and burst width may depend on factors, such as the application and the desired power usage. An exemplary burst 102 is illustrated in FIG. 10.

The burst starts a pulse oscillator 204 that provides the triggering signals for each pulse. The pulse oscillator may operate at, for example, 0.5 to 20 MHz, and often from, for example, 2 to 10 MHz to provide, for example, 5 to 2000 pulses per burst. Higher or lower oscillator rates and larger or smaller numbers of pulses per burst may be used, depending on factors, such as, for example, the application and the desired power usage.

These triggering signals are provided along an optional transmitter delay line 206 to a pulse generator 208 that produces a pulse with a desired pulse length. The optional transmitter delay line 206 may provide a desired delay to the transmission pulses to produce a desired difference in delays between the transmitter and receiver pulses. In some embodiments, the transmitter delay line 206 is used to provide a delay of, for example, one quarter wavelength of an RF oscillator frequency to allow for quadrature detection, as described below.

The pulse generator provides a pulse with a desired pulse length at each pulse from the pulse oscillator. The width of the pulse determines, at least in part, the width of the detection shell, as described above. The pulse width may range, for example, from 1 to 20 nanoseconds, but longer or shorter pulse widths may be used. An example of the pulses 104 from the pulse oscillator is provided in FIG. 10.

The pulse is then provided to an RF oscillator 210 that operates at a particular RF frequency to generate a pulse of RF energy at the RF frequency and having a pulsewidth as provided by the pulse generator 208 at a pulse rate determined by the pulse oscillator 204 during a burst period as initiated by the burst initiator 202. The RF frequency may range from, for example, 1 to 100 GHz, and often from, for example, 2 to 25 GHz, however, higher or lower RF frequencies may be used.

The pulses of RF energy are provided to an RF antenna 212 for radiating into space, as described above. The short duration of the pulses typically results in the irradiation of an ultra-wideband (UWB) signal. In addition, the RF antenna 212 may ring, thereby providing multiple detection shells for each pulse.

The pulse oscillator 204, in addition to producing pulses for the transmitter, also provides pulses to gate the receiver. The use of the same pulse oscillator 204 for the transmitter and receiver portions of the radar sensor 200 facilitates timing between the portions. Pulses from the pulse oscillator 204 are sent to the receiver delay line 214 that delays the pulses by a desired time period to determine, at least in part, the distance of the detection shell from the radar sensor, as described above. The receiver delay line 214 may be capable of providing only one delay or a plurality of delays that can be chosen, as appropriate, to provide different radar ranges.

After being delayed, the pulses are provided to a receiver pulse generator 216 that generates a receiver pulse with a desired pulse width. The width of this pulse, as well as the width of the transmitter pulse, determine, at least in part, a width of the detection shell, as described above. Only during the receiver pulse is the receiver gated open, via, for example, a diode 218, to receive radar signals. The pulse width of the receiver pulse typically ranges from zero to one-half of the RF cycle time (e.g., zero to 86 picoseconds at a 5.8 GHz transmit frequency), and often, from one-quarter to one-half of the RF cycle time (e.g., 43 to 86 picoseconds at a 5.8 GHz transmit frequency). However, longer pulse widths may also be used. Receiver pulses 108 are only produced during the burst 102, as illustrated in FIG. 10. The receiver pulses 108 may or may not overlap with the transmitter pulses 104.

Receiver signals are received via the receiver antenna 220, but these signals are only sampled during the receiver pulses. The sampling occurs at, for example, a sample and hold component 222. Typically, the sample and hold component 222 includes a gate that can be opened between bursts to isolate the remainder of the circuit.

The receiver signal is then provided to one or more amplifier stages 224. Multiple amplifier stages may be used to provide simultaneous outputs from multiple transmitter and receiver delay line settings.

The signal is then provided to an optional A/D converter 226 which then sends a corresponding digital signal to a processor 228, for example, a microprocessor that evaluates the signal and provides a response. The processor 228 may operate an actuator 230 according to the converted receiver signal. For example, the processor may direct the actuator 230 to open or close a valve 232. Alternatively, the receiver signal may be analyzed using an analog processor (not shown) that may then operate the actuator.

It will be understood that this low power radar sensor may be used to operate devices other than an actuator or a valve. In addition, components such as one or more of the amplifier stages, the A/D converter, and the processor may be included with the radar sensor or they may be external to the sensor.

Figure 12:
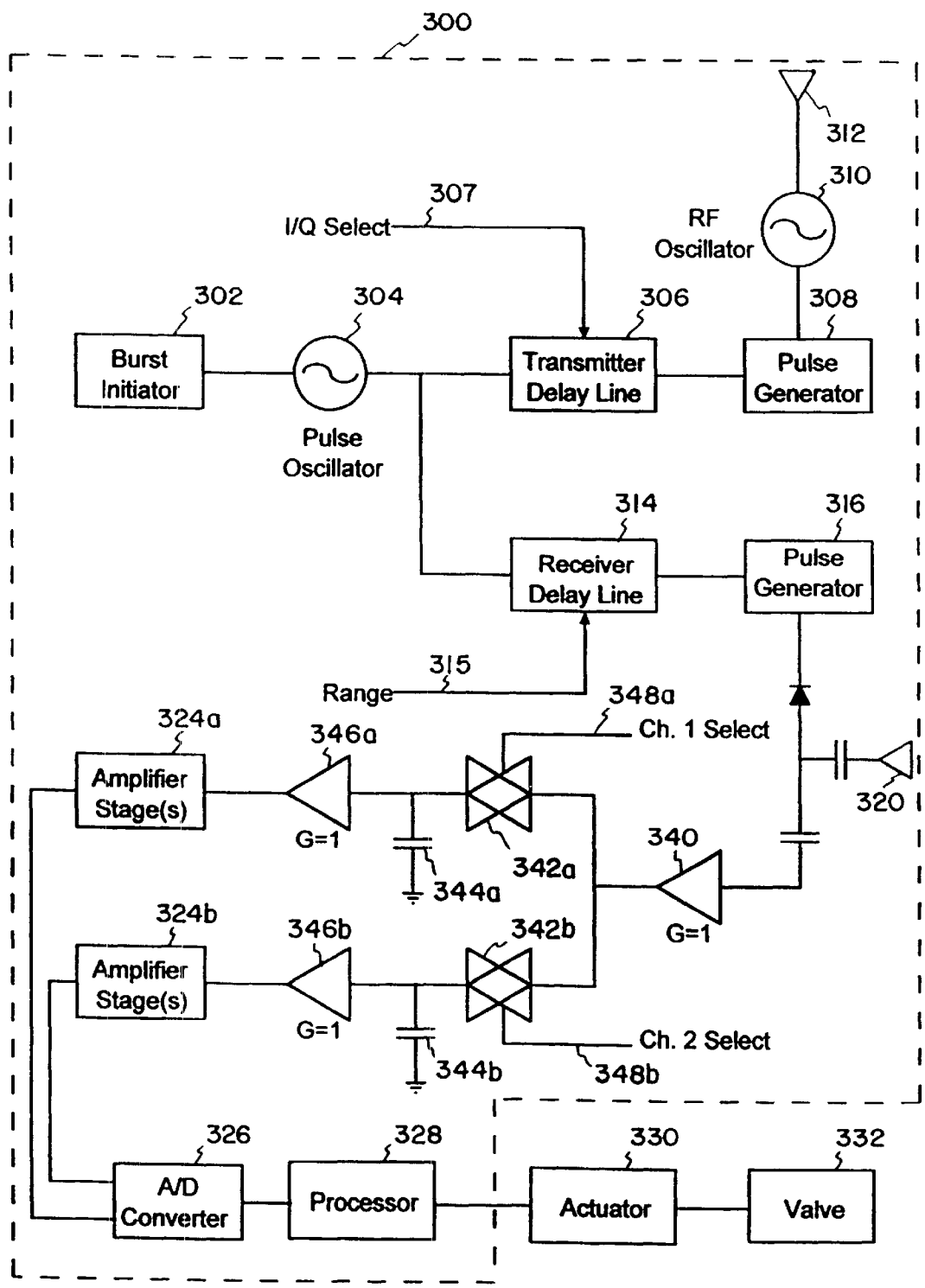
FIG. 12 is a block diagram of a second exemplary embodiment of a low power radar sensor, according to the invention.

Another exemplary low power radar sensor 300 is illustrated in FIG. 12. The radar sensor 300 includes a burst initiatior 302, pulse oscillator 304, transmitter delay line 306, pulse generator 308, RF oscillator 310, and transmitter antenna 312, as described above for radar sensor 200. An I/Q select 307 is optionally provided on the transmitter delay line 306. The I/Q select 307 can change the transmission pulse delay by, for example, one quarter of a cycle of the RF frequency of the RF oscillator 310.

This can be used for quadrature detection to enable determination of the direction of movement of an object within the sensor field. For example, during a first burst, the transmission pulse delay may be a first time and during a second burst the transmission delay may be a second time that is a combination of the first time and one quarter of the cycle time at the RF frequency. The radar sensor may continue to alternate; using the corresponding signals for quadrature detection to determine direction of movement. In some embodiments, more than one burst may be provided before alternating or the alternation may occur during a burst.

The receiver portion of the radar sensor 300 includes a receiver delay line 314 coupled to the pulse oscillator 304, a pulse generator 316, and a receiver antenna 320, similar to those described for radar sensor 200. An optional range select 315 is provided with the receiver delay line 314 to selectively alter the delay provided by the receiver delay line 314.

An exemplary sample and hold component coupled to the receiver antenna 320 and pulse generator 316 is illustrated in this embodiment, however, other sample and hold components can be used. The sample and hold component includes a first buffer 340 (e.g., an operational amplifier with gain of about one), a gate 342*a* (e.g., a transmission gate), a hold capacitor 344*a* connected to ground, and a second buffer 346*a*.

This embodiment also illustrates the use of a two channel device with the second channel having a gate 342*b*, a hold capacitor 344*b* connected to ground, and a second buffer 346*b*. In this embodiment, both channels use the same first buffer, but individual first buffers could also be used. It will be understood that other embodiments may have only one channel or they may have three or more channels. Each channel has a channel select 348*a*, 348*b* coupled to the gate 342*a*, 342*b* to open and close the channel. All of the channels are typically closed between bursts and typically only one channel is open during each burst. This isolates the subsequent amplifiers except when a signal for a particular channel is received.

The signal from each channel is then passed through one or more amplifier stages 324*a*, 324*b*. The amplified signal can then be processed by, for example, analog circuitry (not shown) or by an A/D converter 326 and a processor 328. The processed signal can then be used to operate, for example, an actuator 330 to open or close a valve 332. It will be understood that the radar sensor can also be used for other purposes than operating an actuator and a valve.

In this radar sensor 300, the processor 328 may be a microprocessor that also operates as the burst initiator 302, I/Q select 307, range select 315, channel 1 select 348*a*, and/or channel 2 select 348*b*. Alternatively, one or more other microprocessors or other components can provide one or more of these functions.

Figure 13:
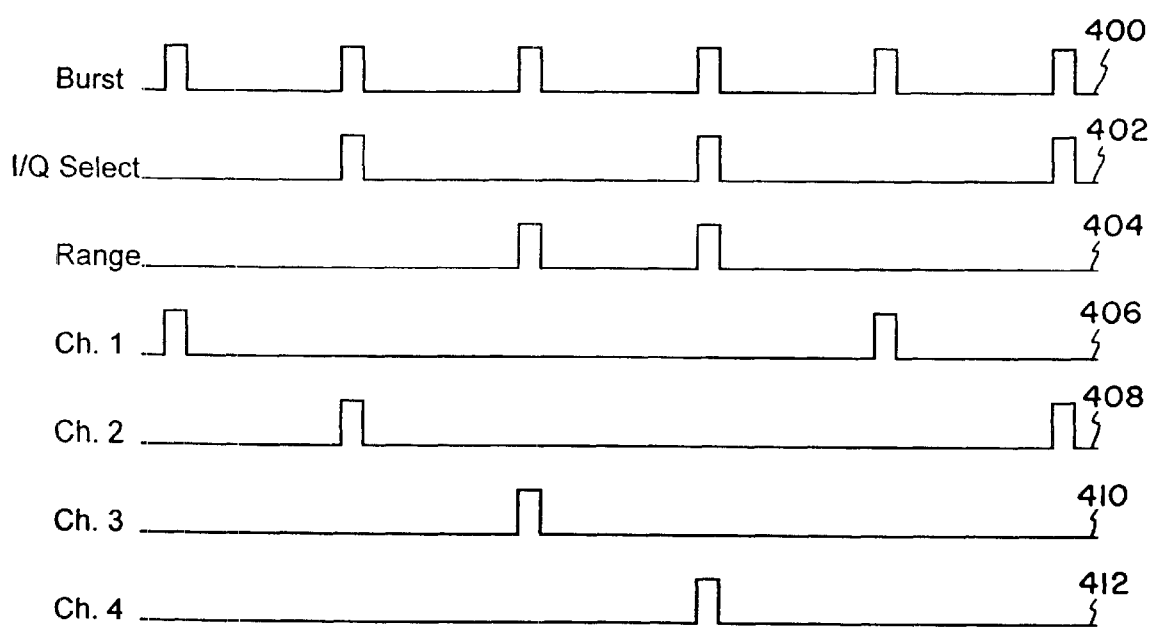
FIG. 13 is an exemplary timing diagram of a four-channel low power radar sensor, according to the invention.
Figure 15:
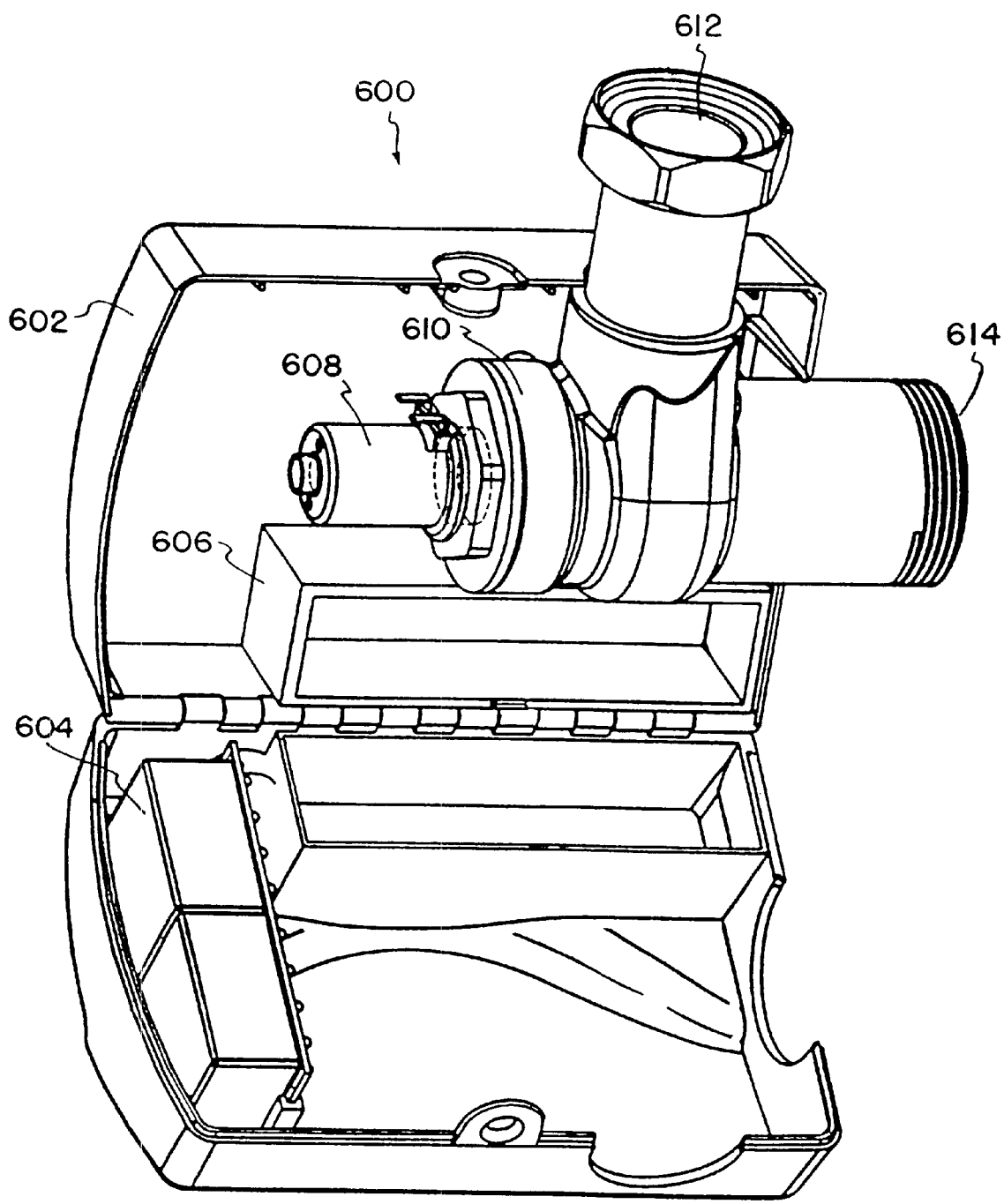
FIG. 15 is a perspective view of one embodiment of a fluid flow control device, according to the invention.

An exemplary timing diagram for a four channel radar detector with in-phase and quadrature detection at a near and a far range is illustrated in FIG. 13. The burst channel 400 produces bursts at regular intervals according the burst rate. The I/Q select channel 402 alternates between in-phase (no signal in I/Q select channel) and quadrature detection (signal in I/Q select channel). The presence of a signal in the I/Q select channel can cause, for example, the transmission delay line to increase the delay of the transmission pulses by, for example, one-quarter of a wavelength of the RF frequency.

The range channel 404 allows for in-phase and quadrature detection at a near range (no signal in range channel) followed by in-phase and quadrature detection at a far range (signal in range channel). The presence of a signal in the I/Q select channel can cause, for example, the receiver delay line to provide a longer delay.

Each of the channel selects is operated one at a time to provide an appropriate signal through the appropriate channel. For example, as illustrated in FIG. 13, channel one 406 corresponds to in-phase detection at a near range, channel two 408 corresponds to quadrature detection (when combined with the signal from channel one) at a near range, channel three 410 corresponds to in-phase detection at a far range, and channel four 412 corresponds to quadrature detection (when combined with the signal from channel three) at a far range. In this particular embodiment, channel information is obtained at one quarter the burst rate.

The number of channels, their assignment to particular signals, the order of detection, the number of bursts before changing channels, and other similar aspects of the timing diagram can be altered. By using such timing mechanisms, a variety of different signals can be obtained and used to determine characteristics of an object, such as presence, motion, and/or direction of motion, in the sensor field.

One example of the use of a low power radar sensor for fluid flow control device is with a sink and faucet. A single channel or multi-channel (in which only one channel is actively used) device can be used to detect the presence or movement of a user in the radar field. A metered flow of water may be provided from the faucet when a user is detected. Alternatively, water may be provided until the presence or movement of the user is no longer detected. A similar sensor can also be used with a urinal, toilet, or a variety of other devices, including bathroom, restroom and kitchen fixtures.

Another example is a toilet. Two channels of a radar sensor are used to determine motion and direction of motion of a user. When the radar sensor detects a user moving away from the toilet after having previously detected a user moving toward the toilet, then the radar sensor can direct the toilet to flush. The radar sensor might also include more complex instruction, such as, for example, requiring a certain period of time that the user is detected approaching the toilet and a period of time between the approach to the toilet and movement away from the toilet before deciding that a valid flush condition exists. This configuration can also be used with faucets, urinals, and a variety of other devices, including bathroom, restroom and kitchen fixtures.

Yet another example utilizes three channels. The radar sensor is configured to detect motion at a far range, motion at a near range, and direction of motion at a near range. In the example of a toilet, the radar sensor knows to flush if the following sequence (or alternatively a subset of this sequence) occurs: 1) motion at the far range, 2)motion at the near range, 3) motion toward the toilet, 4) motion away from the toilet, and 5) motion at the far range. Again, the radar sensor may include more complicated instructions regarding the time of or times between these events. This configuration can also be used with faucets, urinals, and a variety of other devices, including bathroom, restroom and kitchen fixtures.

Exemplary Applications

Figure 14:
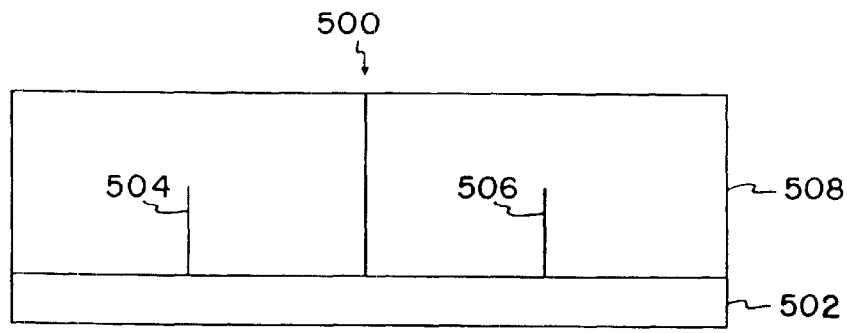
FIG. 14 is a side view of one embodiment of a radar sensor, according to the invention.

One exemplary radar sensor 500 includes a circuit board 502 upon which some or all of the radar circuit elements are disposed, a transmitter antenna 504 (such as a monopole antenna or a directional antenna), a receiver antenna 506 (such as a monopole antenna or a directional antenna), and a sensor housing 508, as illustrated in FIG. 14. The radar sensor may also include optional items, such as, for example, a manual operation button to, for example, direct the actuator to manually flush a toilet or operate a sink, a low-battery indicator (such as, for example, an LED), a voltage regulator, a display to indicate that the sensor has detected the user, and programming, adjustment, and test connections.

An exemplary fluid flow control device 600 includes a housing 602, a radar sensor 604, a battery holder 606 and/or outlet plug (not shown), an actuator 608 (such as a solenoid), and a valve apparatus 610. The valve apparatus 610 has a fluid inlet 612 and a fluid outlet 614. The valve apparatus 610 is opened and closed by the actuator 608 in response to the radar sensor 604.

Fluid flow control devices utilizing radar detectors are useful in a wide variety of applications. Of particular interest is the use of such devices in bathroom and restroom fixtures, such as urinals, toilets, bidets, and faucets. Radar-control of fluid flow can facilitate the operation of these fixtures without active participation by the user. Instead the fixture operates in response to ordinary actions of the user including approaching the fixture, leaving the fixture, and placing a body part, such as a hand, in proximity to the fixture.

FIGS. 7A–7D illustrate the implementation of a radar-based fluid flow control device in a urinal 78. The actuator of the device is typically coupled to a water inlet conduit which connects the urinal to an external water source. The actuator of the fluid flow control device is primarily used to automate the flushing mechanism of the urinal. The radar detector 26 may detect, for example, the presence or absence of a user at the urinal or may detect the motion of the user toward and then away from the urinal. The radar detector 26 may then direct an actuator (not shown) via control circuitry (not shown) to open and close at appropriate times.

In one particular embodiment, radar detector 26 detects the presence of the user by comparing a current radar signal with a previously recorded background signal. If the current radar signal differs from the background signal by a threshold amount, then a user is detected. Optionally, the radar detector 26 may require that the signal indicating the presence of a user remain above a threshold level for a predetermined amount of time, e.g., 3–10 seconds, to ensure that an actual user is present, thereby distinguishing, for example, a passerby or an insect near the radar detector. The radar detector 26 may optionally record a background signal at regular intervals (unless a user is present) to update the background signal and account for any environmental changes in order to maintain a current and correct background signal.

After a user is detected, the radar detector 26 may continue to interrogate the sensor field 80 with radar emissions until the user leaves, as indicated by the reduction of the radar signal to less than the threshold difference above the background signal. Once the user leaves, the actuator is opened so that water is flushed through urinal 78 to remove waste in the urinal 78. Optionally, the radar detector 26 may require that the absence of the user be indicated for a predetermined amount of time, e.g., 3–10 seconds, before flushing.

In another embodiment, the radar detector 26 is designed to detect movement in the sensor field 80 indicating a user approaching the urinal 78. The radar detector 26 continues to monitor the sensor field 80 until there is motion indicating that the user has exited the sensor field 80 at which time the actuator is opened to flush the urinal 78 with water.

In some embodiments, the radar detector 26 may be sensitive enough to detect movement of a user during the entire period of use of the urinal by, for example, movement of or within the user's body. Often a user is much less active after approaching a fixture such as a urinal, but there are typically some small movements made by the user, such as shifting weight from one foot to the other. In addition, the radar detector 26 may be sensitive enough to detect involuntary movements such as respiration or heart beat. A sensitive radar system for detecting these movements is described in detail in U.S. Pat. No. 5,573,012, incorporated herein by reference. For such radar systems, the actuator and associated control circuitry may be designed so that the actuator is not opened until there is a cessation of movement within the sensor field, thereby indicating the absence of the user.

A further embodiment combines motion detection with direction detection to determine the correct operation of the urinal. After the user enters the sensor field 80, the detector 26 looks for a pattern of motion toward and then away from the urinal. After the user exits the sensor field 80, the actuator is opened to flush the waste through the urinal 78.

Other embodiments may use two or more receiver gating delays to provide two or more detection shells or ranges. For example, a first gating delay may be chosen to provide a short range, or close shell, to detect the approach of a user to the fixture. Once the user is detected, a second gating delay that generates a longer range, or more distant shell, is used to determine when a user leaves. The urinal 78 is flushed when the user leaves, and the radar detector 26 returns to using the first gating delay to detect another user. Other gating combinations may be used to operate the fluid flow control device.

Optionally, motion or presence detection may be used with any of the described embodiments at a predetermined time, e.g., 3–10 seconds, after the presence of a user is indicated. This provides assurance that there is a valid user. Optional presence or motion detection at about 3–10 seconds after exit of the user helps avoid opening the actuator while the user is still within the field.

Figure 7A:
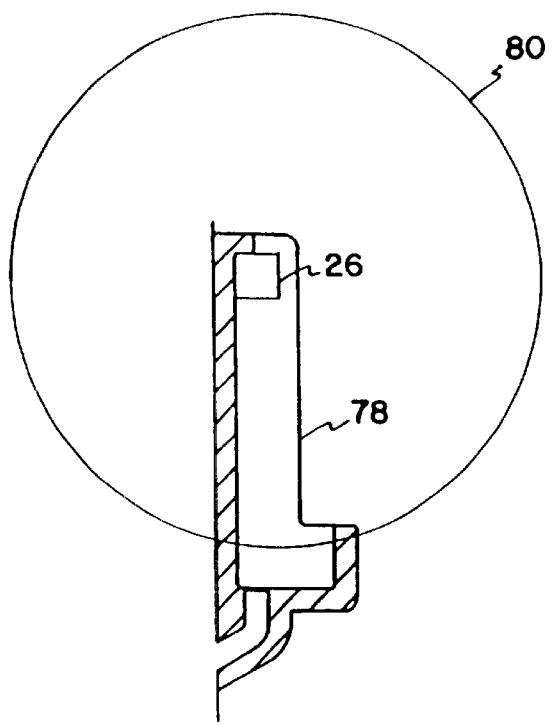
FIGS. 7A–7D are side elevational views of various embodiments of a urinal incorporating the radar-controlled fluid flow control device of FIG. 1 according to the invention.

Although the actuator of the fluid flow control device is typically located near the water inlet conduit of the fixture, other portions of the control device may be placed in different positions relative to the fixture. FIGS. 7A–7D illustrate the placement of radar detector 26 behind urinal 78, and optionally, behind a wall on which urinal 78 hangs (FIGS. 7B and 7D) or within urinal 78 (FIGS. 7A and 7C). There is a much wider array of placement options for radar systems than is available for current infrared detection systems. Radar emissions, especially ultra wideband radar which have low frequency components, are able to penetrate many materials and so the radar system can be placed behind a wall or within the vitreous china or porcelain of the fixture.

One advantageous placement of the radar detector is proximate the water inlet conduit attached to the fixture. This placement is particularly useful for retrofitting current fixtures as the radar detector may be placed next to the electronically controlled actuator (e.g., valve) which may need to be installed to control the fluid flow. The actuator and radar detector can be placed on exposed plumbing conduits or, alternatively, can be placed on a plumbing conduit that is hidden behind a wall. This latter placement of the radar detector is advantageous to avoid vandalism or accidental damage to the radar detector.

Another advantageous placement of the radar detector is within the fixture itself. In this case, the detector is hidden from the user, but can still sense the user through the material of the fixture. FIG. 7A shows the placement of radar detector 26 within urinal 78. This configuration may be advantageous, as compared to the embodiment illustrated in FIG. 7B, because a greater portion of the sensor field 80 is directed toward the region that a user is expected to occupy. In addition, radar detector 26 of FIG. 7A has less sensing area in unneeded directions (e.g., behind urinal 78). This may be important where, for example, there may be other detector-triggering activities occurring on the other side of a wall on which urinal 78 is placed. Often restrooms are positioned so that toilet/urinal facilities of men's and women's restrooms are attached on opposite sides of the same wall for ease of plumbing. If the radar sensor field extends through the wall, then activities on the other side of the wall may cause inappropriate flushing or lack of flushing by the radar-controlled fixture.

Radar detectors may also be placed in cavities currently housing infrared or other touchless control devices. This may facilitate retrofitting current devices.

Figure 7B:
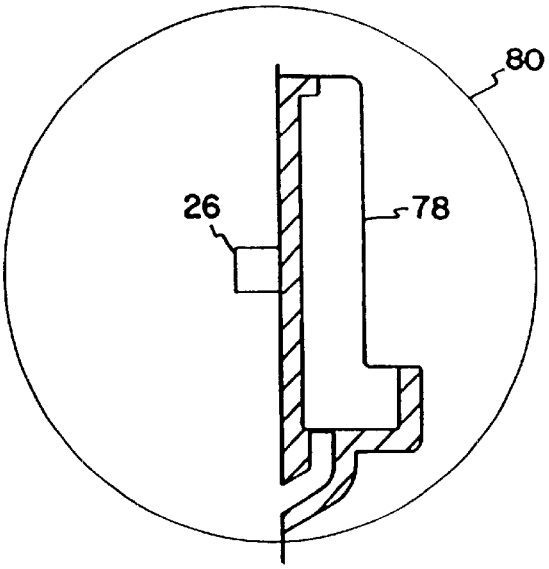
Figure 7C:
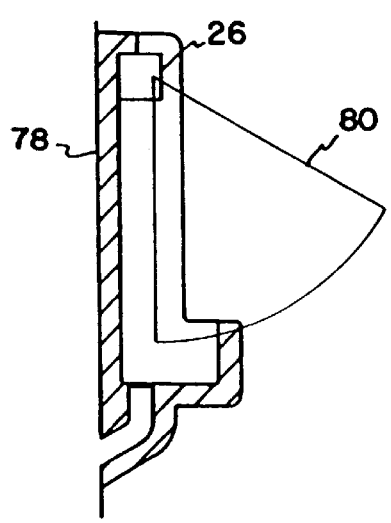
Figure 7D:
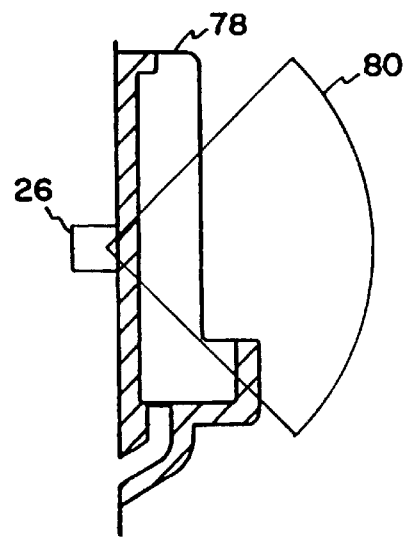

In other embodiments, the direction of the radar is restricted so that instead of forming a spherical sensor field, as depicted in FIGS. 7A and 7B, the sensor field is conically shaped, as depicted in FIGS. 7C and 7D. The restriction of the radar signal can be accomplished through use of a transmission antenna, such as horn antenna, that directionally orients the radar energy. A receiver antenna, separate from the transmitter antenna, may also be directionally oriented. A directional radar field is created that can be oriented toward the expected positions of users. This configuration is especially useful in restrooms with a series of urinals or other radar operated fixtures in close proximity to each other. Such conditions are common in public restrooms, but may also occur in household bathrooms if the toilet, sink, and/or shower are radar-controlled.

Directed radar signals are also useful in diminishing spurious signals due to the detection of the water stream. Typically, water has a high reflectivity with respect to radar signals. Water released by the actuator during flushing is radar detectable. Directing the radar away from the fluid stream may reduce the amplitude of water-reflected signals.

Another method of avoiding spurious signals due to water flow is to ignore signals from the radar detector or turn off the radar detector for a period of time after the flushing of the fixture has been initiated. Typically, this period of time is approximately equal to the length of time that the actuator is open to minimize the chance that a new user may arrive during the period that the detector is ignored or turned off. However, longer or shorter time periods may be used.

The size of the antenna is typically related to the wavelength of the radar energy. In systems emitting radar radiation at a particular RF frequency, the size of the antenna is determined by the wavelength of the RF transmitter signal and the desired radiation pattern. In UWB systems, a wide range of wavelengths is emitted so the central wavelength of the emission band is often used as the basis for antenna design. Other wavelengths within the emission band may, however, be used. It is understood by those skilled in the art that antenna design for UWB systems also depends on the desired bandwidth of the radar signal.

It is desirable that the radar detector be small and that the antenna have a length of only a few inches. This typically means operating the detector with a UWB central frequency in the range of 1–100 GHz.

Another aspect of the radar detection system that can be optimized to avoid spurious signals is the maximum range of the sensor field. For a urinal, a range of 15 to 50 cm (about 6 to 18 inches) beyond the urinal is typically sufficient to detect a valid user.

Figure 8A:
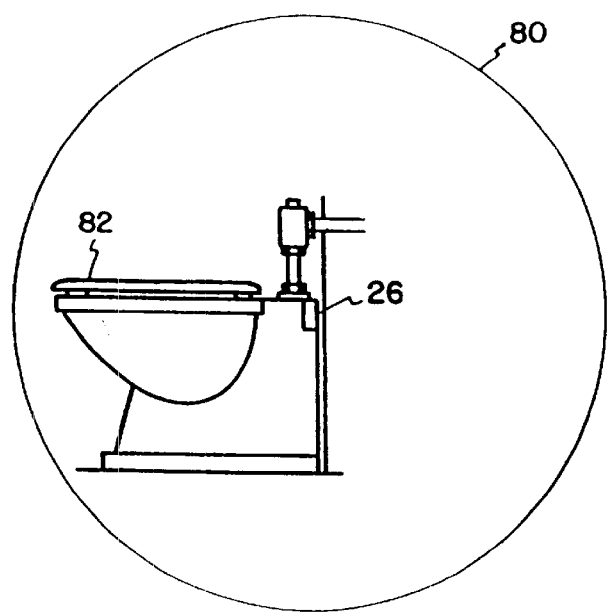
FIGS. 8A, 8C, and 8E are side elevational views of various embodiments of a toilet incorporating the radar-controlled fluid flow control device of FIG. 1.
Figure 8C:
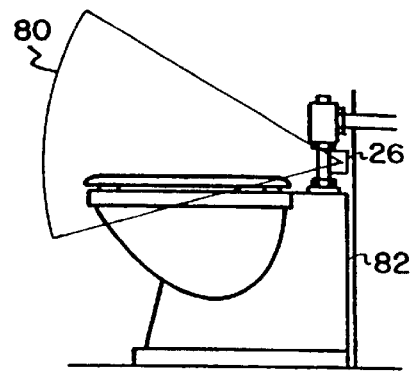
Figure 8E:
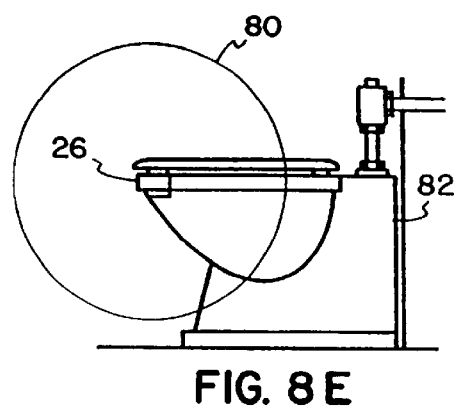

FIGS. 8A–8E illustrate the use of a fluid flow control device having a radar detector 26 with a toilet 82. Radar detector 26 can be used with both commercial and residential toilets, by appropriate choice of actuator design and positioning. FIGS. 8A and 8E show different positions of radar detector 26 within toilet 82 and FIG. 8C illustrates the mounting of radar detector 82 on a water inlet conduit attached to toilet 82. This latter configuration is especially useful for retrofitting existing toilets and may include mounting the radar detector on exposed conduits or on conduits hidden behind a wall. Radar detector 82 may also be mounted behind wall 81, either level with or above or below toilet 82.

Figure 8B:
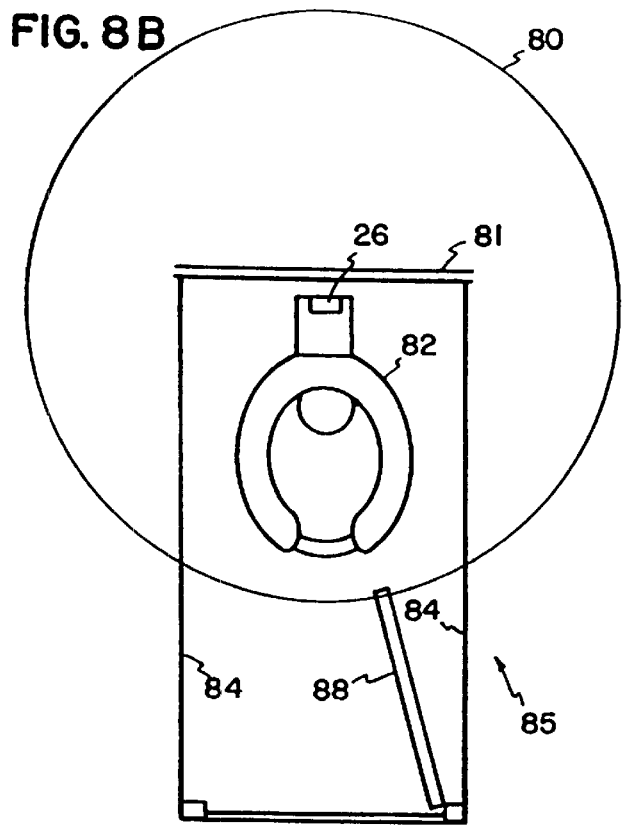
FIG. 8B is a top elevational view of the toilet of FIG. 8A.

FIGS. 8A and 8B are two views of a toilet 82 equipped with a radar detector 26 that provides an approximately spherical radar field 80 around the toilet 82. For toilet use, the radar sensor field 80 typically extends about 30 to 100 cm (about 12 to 36 inches), preferably 50 to 80 cm (about 18 to 30 inches), beyond the toilet to sense all users. A radar sensor field 80 with this range may extend beyond a wall 81 behind toilet 82 or extend beyond walls 84 of a stall 85 surrounding toilet 82. In addition, door 88 of stall 85 may extend within sensor field 80. Movement of door 88, flexing of walls 84, and/or persons in adjoining stalls or on the other side of wall 81 may generate reflected radar signals that result in inappropriate actions by the radar-controlled fixture. Therefore, it may be desirable for the radar sensor to also sense the presence or absence of a user of toilet 82 before taking any action (i.e., before flushing the toilet or before deciding that there is a user and then sensing for the user's departure to activate flushing). This can be accomplished, for example, by using a receiver gating delay that is short and only allows for detection of individuals in very close proximity (e.g. 35 cm (about 12 inches) or less) to the toilet.

Figure 8D:
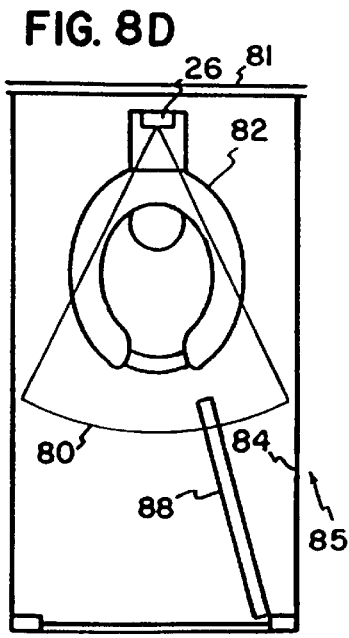
FIG. 8D is a top elevational view of the toilet of FIG. 8C.

In another embodiment, toilet 82 may be equipped with a radar detector 26 that permits directional focusing of the radar signal as illustrated in FIGS. 8C and 8D. Such a configuration allows a narrow focus on the area in which a user is expected to be found.

In other embodiments (not shown), a toilet is equipped with a radar detector that activates an actuator when a user places an object, such as portion of the user's body or an inanimate object, within the sensor field of radar detector. In these embodiments, the radar detector will typically have a very short sensor field and/or a very high signal threshold to avoid inadvertent activation.

Toilet 82 may also have an optional manual flush control (not shown). This manual control can be used if the radar detector is not functioning or if the user wishes to flush the toilet to, for example, remove residual waste from the toilet.

A third embodiment of toilet 82 is illustrated in FIG. 8E, in which radar detector 26 is positioned in the front portion of toilet 82. In this position, radar detector 26 is able to sense users either sitting on or standing in front of toilet 82 with a sensor field 80 of reduced size. Hence, the likelihood of picking up spurious signals is also reduced.

To avoid spurious signals due to the movement of water through the toilet during the flushing process, radar detector 26 is optionally turned off or ignored during periods of flushing. However, the time period that radar detector 26 is turned off or ignored is preferably minimized to avoid non-detection of a user arriving immediately after the flushing of waste.

FIGS. 9A–9F illustrate various configurations of the radar detector 26 of fluid flow control device 20 with respect to a faucet 38 and sink 40. Typically, the fluid flow control device operates by detecting either presence or motion of a user within a radar sensor field 80 and opening an actuator (e.g., a valve) to allow water to flow through faucet 38 into sink 40. The actuator typically remains open until either the presence or motion of the user within the sensor field 80 is no longer detected. In another embodiment, a timing mechanism is used which directs the radar detector to search for motion or presence in the field after a given time period (e.g., 10 to 45 seconds) to determine if a user is still at the fixture; if a user is not sensed then the actuator is closed.

FIG. 9A shows radar detector 26 positioned in front of or within the front portion of sink 40. This position is advantageous as a relatively small radar sensor field 80 can be used to detect the movement of a user's body, and in particular the user's hands, into sink 40 and under faucet 38.

FIG. 9B illustrates a radar detector 26 placed behind sink 40 and, optionally, in a wall behind the sink. This configuration may be useful for retrofitting existing sinks. If radar detector 26 is placed behind a wall then the detector can be hidden which may be aesthetically pleasing and may reduce the possibility of vandalism or inadvertent damage.

FIG. 9C illustrates a radar detector 26 with a directional antenna for focusing the radar energy in a given direction. Radar detector 26 may, for example, be placed within the material (e.g., vitreous china or fiberglass) which forms sink 40 or may be placed in a cabinet (not shown) or other enclosure surrounding sink 40. Radar detector 26 may be placed anywhere around sink 40, including in front of sink 40 (as illustrated in FIG. 9C), under sink 40, or behind sink 40. Radar detector 26 may be placed in a wall behind sink 40 and may be level with sink 40 or higher or lower than sink 40.

The configuration illustrated in FIG. 9C may have advantages over other configurations because the radar signal does not impinge on the water stream that exits faucet 38. Because water reflects radar energy well, radar detector 26 may, in certain situations, be unable to determine if a user has left sensor field 80 because of reflections caused by the stream of water. Therefore, by directing the sensor field 80 away from the water, but still in a direction in which a user is expected to be found, spurious signals from the flowing water may be minimized. Other configurations are possible in which the directed radar signal does not impinge on the water stream. Furthermore, even if sensor field 80 does include the water stream, a timing mechanism may be added to activate the actuator and stop the water flow after a predetermined period of time.

FIG. 9D is an alternate approach to detecting a user of a sink 40. Instead of detecting a user placing a body part, such as hands, within sink 40, the radar detector is pointed away from sink 40 to detect a user standing in front of sink 40. This configuration is advantageous because the sensor field is pointed in a direction opposite the flowing water.

FIG. 9E illustrates another sensor configuration in which the sensor transmitter 28 and receiver 30 are separated. In this case, receiver 30 is gated so that it receives only those signals from transmitter 28 that are not reflections (i.e., those signals with the shortest time-of-flight). When a user places his hands within the sink 40, at least a portion of the radar energy is reflected and/or absorbed and a change in the signal is detected at the receiver. This activates the actuator. Once a user removes his hands, the radar signal is restored to its original strength and the actuator is signaled to close. This configuration substantially overcomes the difficulties associated with reflections of radar energy from the flowing water stream because only the radar energy traveling the shortest distance impinges on the receiver. Radar energy reflected by the water arrives at the receiver when the receiver is gated closed.

An additional configuration is a combination of the systems of FIGS. 9D and 9E, as illustrated in FIG. 9F. The transmitter 28 and receiver 30 detects when a user puts his hands in sink 40 and radar detector 26 determines when the user had left the sink. Additional control circuitry 90 may be needed to operate and interpret signals from this multiple detector arrangement.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:

1. A fluid flow control device comprising:
an actuator for controlling fluid flow;
a radio frequency transmitter configured and arranged to produce a plurality of bursts of pulses, wherein each burst comprises two or more substantially uniformly-spaced pulses of radio frequency energy having a frequency to form a sensor field, the pulses being transmitted at a pulse rate, wherein a time space between adjacent bursts is greater than the pulse rate;
a receiver gated open after transmission of each pulse to receive radio frequency energy reflected by objects within the sensor field determined by a delay time between transmission of each pulse and gating open the receiver;
a processor coupled to the gated receiver for evaluating the reflected radio frequency energy, wherein the processor is coupled to the actuator and is configured and arranged for activating the actuator in response to the reflected radio frequency energy.

2. The fluid flow control device of claim 1, wherein each burst has a burst width that is 5% or less than the time space between bursts.

3. The fluid flow control device of claim 1, wherein the radio frequency transmitter includes a transmitter pulse generator to produce a plurality of transmitter pulses at the pulse rate and a radio frequency oscillator coupled to the transmitter pulse generator to produce the pulses of radio frequency energy at the pulse rate in response to the transmitter pulses.

4. The fluid flow control device of claim 3, wherein the receiver includes a receiver pulse generator coupled to the transmitter pulse generator to produce receiver pulses to gate the receiver in response to the transmitter pulses.

5. The fluid flow control device of claim 4, wherein the receiver further includes a receiver delay line to delay the receiver pulses relative to the transmitter pulses.

6. The fluid flow control device of claim 5, wherein the receiver delay line is configured and arranged to provide at least two different delays.

7. The fluid flow control device of claim 1, wherein the radio frequency transmitter includes a transmitter delay line to produce a delay in at least selected pulses of radio frequency energy.

8. The fluid flow control device of claim 1, wherein the receiver is configured and arranged to receive reflected radio frequency energy from at least two different ranges.

9. The fluid flow control device of claim 1, further comprising a valve coupled to the actuator, the actuator opening or closing the valve when activated.

10. The fluid flow control device of claim 1, wherein the processor is configured and arranged for detecting a presence of an object in the sensor field based on the reflected radio frequency energy.

11. The fluid flow control device of claim 1, wherein the processor is configured and arranged for detecting motion of an object in the sensor field based on the reflected radio frequency energy.

12. The fluid flow control device of claim 1, wherein the transmitter includes a directional transmitter antenna.

13. The fluid flow control device of claim 1, wherein the frequency of the pulses is in the range of 1 to 100 GHz.

14. The fluid flow control device of claim 1, wherein the radio frequency transmitter comprises:
- a burst initiator to provide the plurality of bursts at a burst rate and having a burst width that is 5% or less than a time between bursts;
- a transmitter pulse generator coupled to the burst initiator to produce a plurality of transmitter pulses at a transmitter pulse rate and with a transmitter pulse width during each burst;
- an radio frequency oscillator coupled to the transmitter pulse generator to provide pulses of radio frequency energy in response to the transmitter pulses;
- a transmitter antenna to transmit the pulses of radio frequency energy and form a sensor field;

and wherein the receiver comprises:
- a receiver antenna to receive radio frequency energy that has reflected off objects in the sensor field;
- a receiver pulse generator coupled to the transmitter pulse generator to generate receiver pulses at a receiver pulse rate and with a receiver pulse width;
- a receiver delay line between the receiver pulse generator and the transmitter pulse generator to delay the receiver pulses with respect to the transmitter pulses; and
- a receiver sampler coupled to the receiver antenna and the receiver pulse generator to sample the radio frequency energy received by the receiver antenna during the receiver pulses wherein the processor evaluates the radio frequency energy sampled by the receiver sampler.

15. A method of providing a fluid flow in response to a user, comprising the steps of:
- transmitting a plurality of bursts of pulses, wherein each burst comprises two or more substantially uniformly-spaced pulses of radio frequency energy having a frequency to form a sensor field, the pulses being transmitted at a pulse rate, wherein a time space between adjacent bursts is greater than the pulse rate;
- receiving reflections of the radio frequency energy from objects within the sensor field by gating open a receiver after transmission of each pulse, the sensor field being determined by a delay time between transmission of each pulse and gating open the receiver;
- making an evaluation of the reflections of the radio frequency energy to determine a characteristic of a user in the sensor field; and
- activating an actuator based on the evaluation of the reflections of radio frequency energy.

16. The method of claim 15, wherein each burst has a burst width that is 5% or less than the time space between bursts.

17. The method of claim 15, wherein making an evaluation of the reflections of the radio frequency energy includes making an evaluation of the reflections of the radio frequency energy to determine one or more of: a presence of a user in the sensor field, motion of the user in the sensor field, and direction of motion of the user in the sensor field.

18. The method of claim 15 further comprising the steps of:
- determining if a user is present in the sensor field based on the evaluation of the reflected radio frequency energy;
- when a user is detected, receiving reflections of the radio frequency energy from objects within a second sensor field by gating open a receiver after transmission of each pulse of the pulsed radio frequency energy, the second sensor field having a farther range than the first sensor field; and
- activating the actuator based on the evaluation of the reflections of radio frequency energy from the first and second sensor fields.

19. The method of claim 18, wherein the actuator is configured and arranged to flush a device selected from the group consisting of toilets, and urinals.

20. The method of claim 19, wherein the processor is configured and arranged to flush the device after it is determined that a user has entered the first sensor field and exited the second sensor field.

* * * * *